June 21, 1960
N. C. UECKER
2,941,306
ROLL RING FADE MECHANISM
Filed Sept. 5, 1957
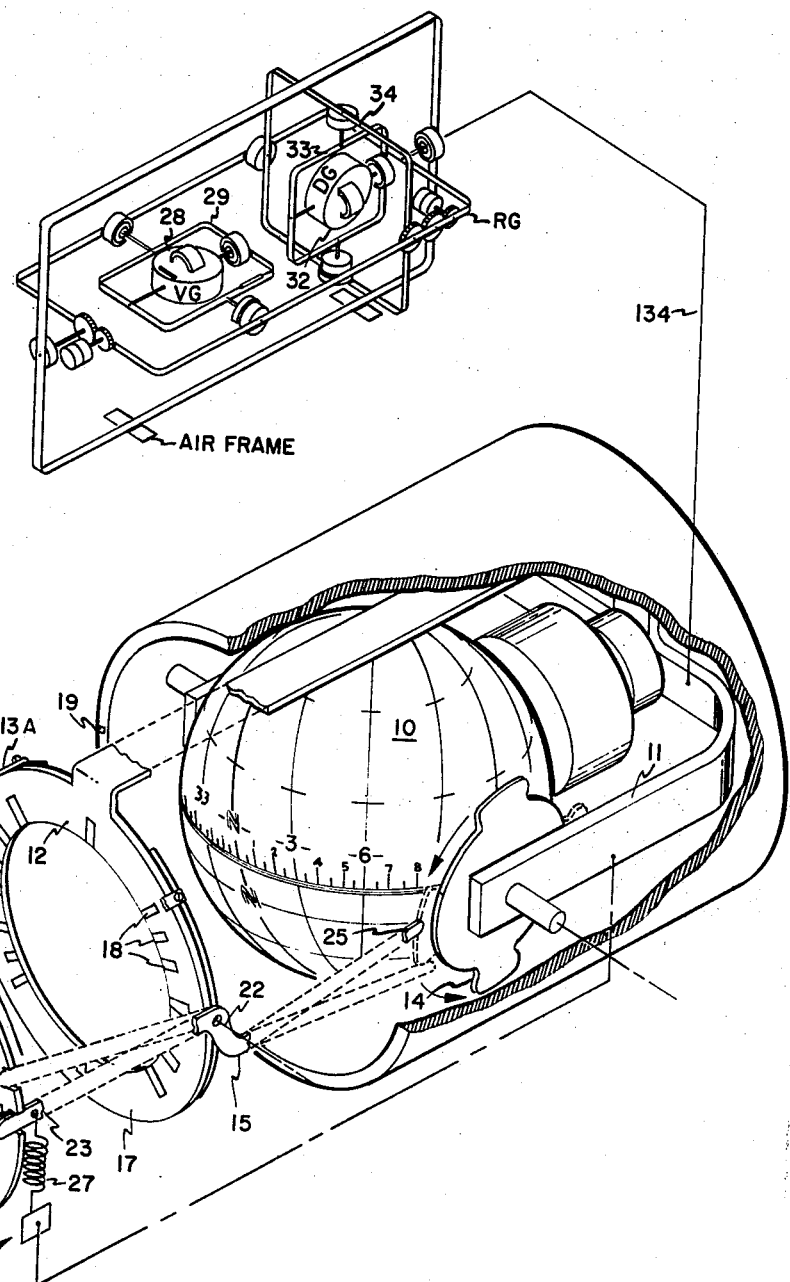
INVENTOR
Norman C. Uecker
BY Clyde H. Haynes

United States Patent Office 2,941,306
Patented June 21, 1960

2,941,306

ROLL RING FADE MECHANISM

Norman C. Uecker, Grand Rapids, Mich., assignor to Lear, Incorporated

Filed Sept. 5, 1957, Ser. No. 682,162

4 Claims. (Cl. 33—204)

The present invention relates to a roll ring fade for all attitude maneuvers and in particular to a mechanism for fading out and obliterating indications on a roll indicator when the aircraft is in a pre-determined attitude.

The invention is particularly adaptable to systems for presenting airframe attitudes and the position of airframe roll, pitch and azimuth axes relative to earth oriented roll, pitch and azimuth axes. In these systems there is a gyro mechanism including gimbals for establishing and maintaining the earth oriented roll, pitch and azimuth axes. An indicator device is governed by the gyro mechanism to present to the pilot the airframe roll, pitch and azimuth axes attitude relative to the respective space oriented axis maintained by the gyro mechanism.

Normally, the gyro mechanism is preset for level flight conditions wherein the respective roll, pitch and azimuth axes of the gyro mechanism and the airframe are at least parallel to each other.

When the airframe goes into a vertical flight attitude, wherein the airframe roll axis is parallel with the earth oriented azimuth axis of the gyro mechanism, roll information of the airframe about its roll axis is ambiguously or falsely presented on the roll ring part of the indicator. This is due to the fact that airframe roll is not about the earth oriented roll axis but is about the earth oriented azimuth axis. In addition, as the airframe passes through vertical, i.e., the position wherein the airframe roll axis is 90° perpendicular to the earth oriented gyro mechanism roll axis, the gyro mechanism causes the roll ring to rotate 180° even though there is no rotation of the airframe about its roll axis.

It is well known to pilots that such presentations can be confusing and thus dangerous since the pilot is able to see false aircraft roll information.

One of the objects of the present invention is to provide an indicator which overcomes the aforementioned problems and others and which will present information to the pilot which is not false, ambiguous or misleading.

A further object of the invention is to provide an indicator with a roll ring for presenting roll information to the pilot during level flight and a shutter for covering, fading out or obliterating the indications on that ring when the plane is flying in or near a vertical flight attitude.

Further objects and a fuller understanding of the invention will become apparent from the following description when taken in conjunction with the accompanying drawing which illustrates the roll ring fade mechanism on the indicator, the parts being shown in perspective.

The invention is described and illustrated in connection with a three-axis indicator and its associated gyro mechanism for purposes of clarity and not limitation. In this indicator there is provided a sphere 10 mounted within a gimbal 11 and a roll ring 12. The roll ring or roll ring indicator 12 is secured to the roll gimbal 11 in front of sphere 10 in such manner that the ring 12 encircles the sphere or element 10. Rotatably mounted on the roll ring indicator 12 is a roll ring shutter 13. The structure further provides the sphere or element 10 with a cam 14 and provides a lever arm 15 operable by the cam 14 to angularly move the shutter 13 relative to the roll ring indicator 12.

The roll ring 12 is mounted in front of the element or sphere 10 and annularly about the roll axis 16 so that the pilot may see the element 10 through the roll ring 12. The roll ring has a front surface 17 provided with spaced indices or marks 18 and the indicator has an aircraft fixed roll index 19 with these indices 18 to present the amount of roll relative to the horizon during level flight to the pilot.

The shutter 13 is mounted directly in front of and on the roll ring 12 by suitable means, such as for example, clips 13a and is angularly movable about the roll axis 16 or rotatable or movable relative to the roll ring 12. In this instance, the shutter 13 has a plurality of slots or openings 20 each of which is aligned with its respective one of the indices or marks 18. The shutter 13 also has a front surface 21 preferably of similar color and appearance to the surface 17 of the ring. Angular movement of the shutter relative to the ring moves the openings 20 to positions between the indices or marks 18 to obliterate these marks and thus cause the front surface of the shutter and the surface 17 of the roll ring between the indices to be visible to the pilot as a substantially continuous surface completely void of any indices or marks so that roll information is completely obliterated.

In this instance and for purposes of description, the device is preset with the openings 20 aligned with the indices 18 when the aircraft is in level flight whereby roll attitude of the airframe is presented to the pilot by the position of the indices 18 relative to the roll index 19. When the aircraft is moved into vertical flight, the shutter is angularly moved relative to the ring so that it covers the indices 18 and thus obliterates roll information.

The lever arm 15 is pivoted to the roll ring 12 for pivotal movement about an axis 22 which is transverse to the roll axis 16. The lever 15 has one end 23 on one side of the pivot axis 22 engaged in a slot 24 in the shutter 13 and has its other end 25 engageable with the cam 14. The lever 15 is normally biased to a position wherein the shutter permits the pilot to see indices 18 by means of a spring 27 connected between the end 23 of the lever and a suitable part of the indicator mechanism, such as for example, the roll ring or the roll gimbal 11.

The gyro mechanism illustrated in the drawings for the purpose of better explaining the invention includes a roll stabilized vertical gyro VG and a directional gyro DG. The directional gyro DG is additionally pitch stabilized.

The vertical gyro VG has a gyro rotor, an inner gimbal 28 the axis of which is parallel to the aircraft's roll axis and an outer gimbal 29 the axis of which is parallel to the aircraft's pitch axis. The gyro rotor spin axis is maintained at true vertical by suitable well known erection systems which constantly torque the inner roll and pitch gimbals to gravity vertical.

The directional gyro has a gyro rotor, an inner gimbal 32 the axis of which is maintained horizontal, a second gimbal 33 the axis of which is maintained vertical by a pitch follow-up gimbal 34 the axis of which is parallel to the aircraft's pitch axis. A suitable leveling system, holding the inner gimbal 32 at a zero displacement condition and the pitch follow-up gimbal holding the azimuth 33 gimbal vertical, both act to maintain the directional gyro DG rotor spin axis horizontal.

The vertical gyro's outer gimbal 29 and the directional gyro's outer gimbal 34 are suspended from the common outer roll gimbal RG. The outer roll gimbal RG is servoed normally to maintain the inner roll gimbal 28 at zero displacement with respect to the vertical gyro VG whereby the gyro spin axis is perpendicular to the pitch axis through any and all maneuvers to which the gyro may be subjected.

The outer roll gimbal RG is in turn pivoted on the airframe and is operatively connected to the gimbal 11 supporting roll ring 12 in such manner that roll of the airframe about its roll axis is indicated by roll ring 12. The gyro mechanism thus provides the roll, pitch and azimuth earth oriented axes and causes the indicator to present the positions of the airframe axis relative thereto. Thus roll information of the airframe is presented to the pilot correctly when the airframe roll axis and the gyro mechanism roll axis are parallel.

The actuating device operates as follows: Assuming the aircraft is in level flight and the element 10 has its roll axis 16 positioned for level flight, the spring 27 holds lever 15 so that the openings 20 are aligned with indices 18 and cam 14 is not engaging lever end 25. When the aircraft approaches a vertical flight path, the airframe moves and the gyro mechanism gimbals cause lever end 25 to engage cam 14, thus pivoting the lever about pivotal axis 22 to angularly move shutter 13. This angular moving of shutter 13 moves the openings 20 out of alignment with the indices 18 to obliterate the indices so that the roll information is not presented to the pilot by the roll ring 12 during near vertical flight attitudes. When the aircraft returns towards horizontal flight path, lever end 25 is disengaged from cam 14 and spring 27 moves shutter 13 to a position wherein openings 20 are again in alignment with indices 18, thus making the indices again visible to the pilot.

Although the present invention has been described with a certain degree of particularity, it is understood that various modifications in the details, description and arrangement of parts may be had without departing from the spirit and scope of the invention as hereinafter claimed.

I claim:
1. In an indicator for presenting the attitude of an aircraft to the pilot, the provision of a spherical element maintained at a pre-determined orientation, an annular roll ring movable relative to the spherical element and in accordance with movement of the aircraft, indicia on said roll ring, a mask supported adjacent said annular roll ring, and means connected to move said mask relative to said annular roll ring upon predetermined movement of said annular roll ring relative to said spherical element so that said mask covers said indicia.

2. The structure as defined in claim 1 wherein said mask covers said roll ring and wherein said mask contains apertures through which said indicia are normally visible.

3. In an indicator mechanism for presenting the roll attitude of an aircraft relative to an earth oriented roll axis during generally level flight, an element maintained at a pre-determined axis orientation relative to the earth, a roll indicator movable relative to the element and in accordance with roll movement of the aircraft about an earth oriented roll axis, indices on said indicator, a mask overlying said indicator and having apertures positioned to render said indices visible during level flight, a cam on said element and a lever pivoted on said indicator and engageable with said cam to operate said mask to cover said indices when said aircraft exceeds a predetermined pitch angle.

4. The structure as defined in claim 3 including spring means restraining movement of said lever by said cam.

References Cited in the file of this patent
UNITED STATES PATENTS

| | | |
|---|---|---|
| 2,553,309 | Gabrielson et al. | May 15, 1951 |
| 2,734,278 | Hammond | Feb. 14, 1956 |

FOREIGN PATENTS

| | | |
|---|---|---|
| 791,315 | France | Sept. 23, 1935 |